No. 826,968. PATENTED JULY 24, 1906.
G. H. SPENCE.
NUT LOCK.
APPLICATION FILED NOV. 4, 1905.

Witnesses
Frank B. Hoffman
F. S. Elmore

Inventor
George H. Spence
By Victor J. Evans
Attorney

UNITED STATES PATENT OFFICE.

GEORGE H. SPENCE, OF HERBERT, WEST VIRGINIA.

NUT-LOCK.

No. 826,968.  Specification of Letters Patent.  Patented July 24, 1906.

Application filed November 4, 1905. Serial No. 285,895.

*To all whom it may concern:*

Be it known that I, GEORGE H. SPENCE, a citizen of the United States, residing at Herbert, in the county of Wayne and State of West Virginia, have invented new and useful Improvements in Nut-Locks, of which the following is a specification.

This invention relates to nut-locks, and has for its objects to produce a comparatively simple inexpensive device of this character in which the nut may be readily applied to and removed from its bolt, one wherein the nut will be securely locked in applied position upon the bolt, and one in which the nut may be quickly released for removal.

With these and other objects in view the invention comprises the novel features of construction and combination of parts more fully hereinafter described.

Figure 1:
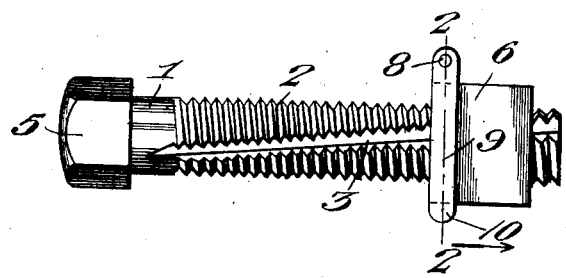
Figure 2:
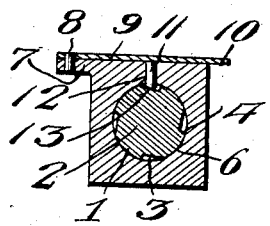

In the accompanying drawings, Figure 1 is an elevation of a bolt and nut provided with a nut-locking means embodying the invention. Fig. 2 is a section taken on the line 2 2 of Fig. 1.

Referring to the drawings, 1 designates a bolt having a screw-threaded portion 2, provided with a plurality of diagonal grooves or recesses 3, extended lengthwise of the portion 2 and of a cross-sectional form to produce radial engaging portions or teeth 4, there being formed at one end of the bolt a head 5, as usual.

Formed for application to the bolt and for threaded engagement with the portion 2 thereof is a nut 6, provided with a laterally-projecting portion or ear 7, to which is secured, by means of a rivet or other fastening member 8, a leaf-spring 9, the free end of which projects beyond the adjacent face of the nut constituting a finger-piece 10, there being fixed at the longitudinal center of the spring 9 and for movement therewith a nut-locking member or pin 11, designed to project through an opening or perforation 12 in the wall of the nut for engagement at its inner end with the bolt 1. It will be observed that the inner engaging end of the pin 11 is beveled, as at 13, for a purpose which will presently appear.

In practice the nut may be readily applied, as usual, to the bolt, and while being screwed onto the latter the inner beveled end 13 of the pin will ride freely over the teeth 4 and is adapted for engagement with one of the teeth to obviate unscrewing of the nut. When it is desired to remove the nut, the finger-piece 10 is engaged and the spring bent outward for lifting the locking-pin 11 free of the path of the teeth 4, thus permitting the nut to be freely unscrewed from the bolt.

It is to be particularly noted that the projection 7 permits ready application of the rivet 8 for fixing the spring 9 securely in place and, further, that by projecting the end of the spring beyond the nut to form the finger-piece 10 the spring may be readily engaged for movement to free the pin 11 from engagement with the teeth 4 in the operation of removing the nut.

From the foregoing it is apparent that I produce a simple device admirably adapted for the attainment of the ends in view, it being understood that in attaining these ends minor changes in the details herein set forth may be resorted to without departing from the spirit of the invention.

Having thus fully described my invention, what I claim as new is—

In a nut-lock, a bolt having a threaded portion provided with radial teeth, a nut formed for engagement with said threaded portion and having a transverse opening extending through one of its sides, and a lug lying flush with said side and arranged adjacent one of the other intersecting sides of the nut, a spring-plate arranged to bear against the apertured side of the nut and of greater length than said side, said spring being pivotally fastened at one end to the lug and having its opposite end projecting beyond the diametrically opposite side of the nut from said lug to form a finger-piece, and a locking-pin fixed for movement with the spring and adapted to project through the opening in the nut for locking engagement with one of the teeth on the bolt, said pin having its engaging end formed to ride over the teeth during the application of the nut to the bolt.

In testimony whereof I affix my signature in presence of two witnesses.

GEORGE H. SPENCE.

Witnesses:
 J. B. BURGESS,
 S. A. BOOTH.